E. H. MARTIN.
BUTTERFLY GATE.
APPLICATION FILED JUNE 6, 1914.
1,147,112.
Patented July 20, 1915.
2 SHEETS—SHEET 1.
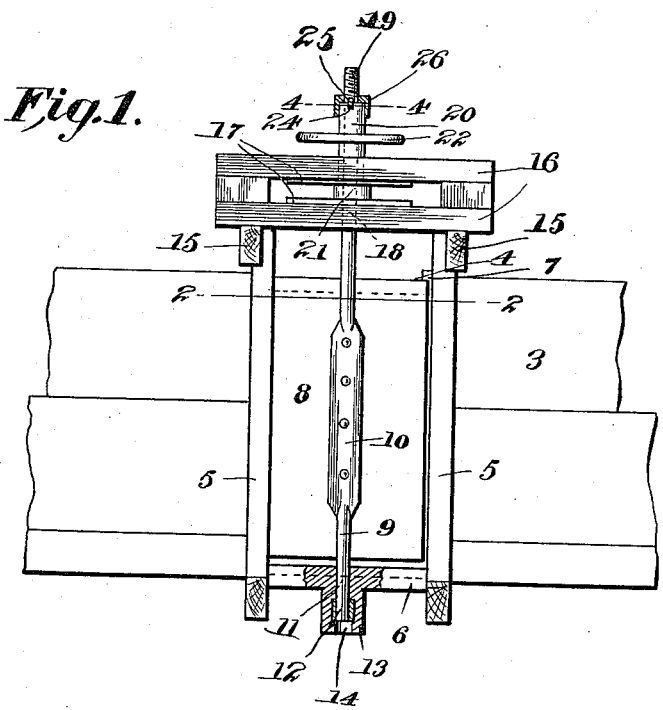
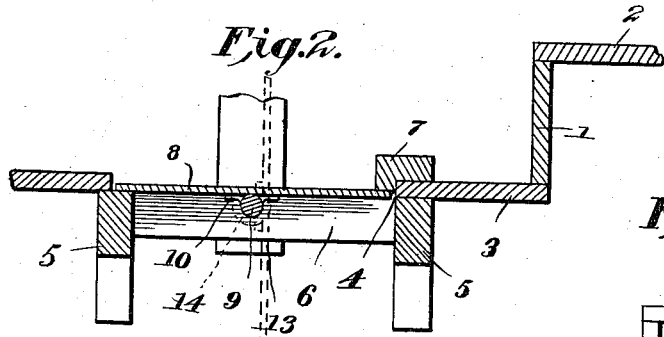
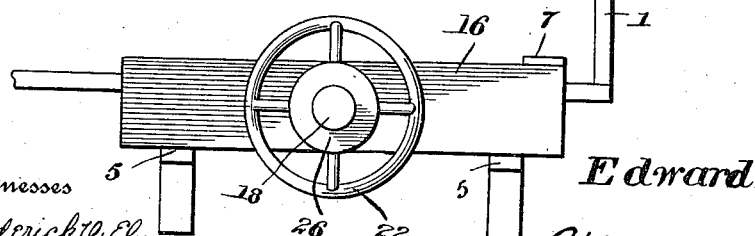
Witnesses
Frederick W. Ely
Ida R. Ferguson
Inventor
Edward H. Martin,
By Victor J. Evans
Attorney E. H. MARTIN.
BUTTERFLY GATE.
APPLICATION FILED JUNE 6, 1914.
1,147,112.
Patented July 20, 1915.
2 SHEETS—SHEET 2.
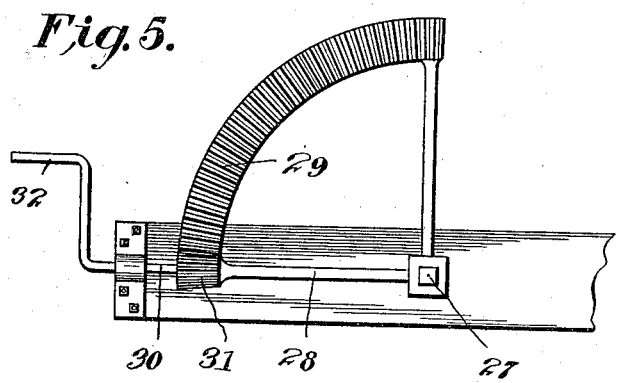
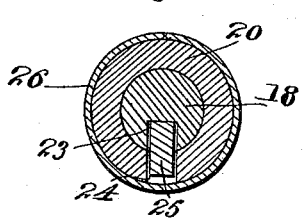
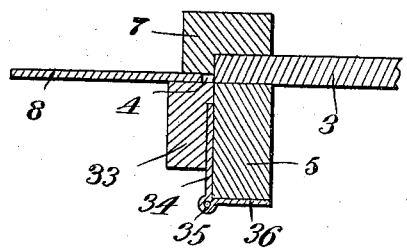
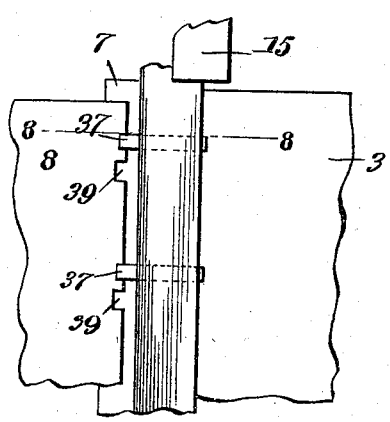
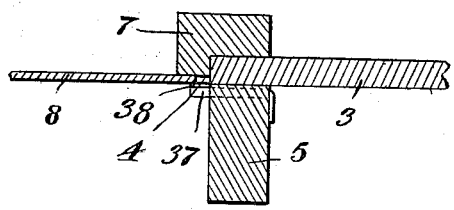
Witnesses
Frederick W. Ely.
Ida R. Ferguson.
Inventor
Edward H. Martin,
By Victor J. Evans
Attorney

UNITED STATES PATENT OFFICE.

EDWARD H. MARTIN, OF COLFAX, CALIFORNIA.

BUTTERFLY-GATE.

1,147,112.  Specification of Letters Patent.  Patented July 20, 1915.

Application filed June 6, 1914. Serial No. 843,480.

*To all whom it may concern:*

Be it known that I, EDWARD H. MARTIN, a citizen of the United States, residing at Colfax, in the county of Placer and State of California, have invented new and useful Improvements in Butterfly-Gates, of which the following is a specification.

The invention relates to an improved gate for use with canals, flumes or the like, and serves to provide for a material saving of time and labor in operating the gate, whereby in the use of the gate as a waste gate a material advantage is gained.

The main object of the present invention is the provision of means whereby the gate may be operated in a vertical direction to free it from its holding means and then rotated to open the outlet providing a type of gate known as a butterfly gate, with the operating means arranged to insure speedy action and a perfect control.

A further object of the invention is the provision of means whereby the gate may be locked with relation to its abutments when in closed position, thereby reducing leakage to the minimum.

The invention in the preferred form of details will be described in the following specification, reference being had particularly to the accompanying drawings, in which:—

Figure 1 is a view in elevation illustrating the improvement in its preferred form. Fig. 2 is a section on the line 2—2 of Fig. 1, a portion of the flume being broken away. Fig. 3 is a plan of the form illustrated in Fig. 1. Fig. 5 is a detail shown in plan illustrating the means of swinging the gate. Fig. 4 is a section on the line 4—4 of Fig. 1. Fig. 6 is a broken sectional view illustrating a means for securing the gate in closed position to prevent leakage. Fig. 7 is a broken elevation illustrating a modified means for locking the gate in closed position. Fig. 8 is a section on line 8—8 of Fig. 7.

In the illustration of the improvement, I have shown the gate designed for use as a waste gate, and while the description will be confined thereto, it is to be understood that I contemplate the use of the details with any type of outlet gate for which they may be adapted.

1 represents a waste box offset from the flume proper 2, the wall 3 of the waste box being formed with an outlet opening 4 extending vertically thereof. The opening 4 has a marginal frame including uprights 5 and a bottom strip 6, one of the uprights extending inwardly beyond the marginal edge of the opening to serve as a gate abutment. The opposing wall of the opening is provided on the inner side with a strip 7 which overlies the adjacent edge of the opening to serve as the opposing abutment, the proximate operating face of the abutments 5 and 7 being offset equal to the thickness of the gate, it being understood that the abutments act in opposition on the gate permitting the latter to swing in one direction and to prevent it from swinging in the opposite direction.

The gate proper comprises an imperforate sheet 8 preferably of metal, having a longitudinal and transverse dimension corresponding to that of the opening 4. The gate is rotatably supported by a pivot rod 9 which throughout the greater portion of the gate is flat as at 10 to permit it to be riveted or otherwise secured to the gate. The rod extends below the gate as at 11, and is rotatably and slidably mounted in a bearing opening 12 formed in the block 13 underlying and secured to the cross frame strip 6, the latter being channeled at 14 to permit passage of the pivot rod. The cross strip 6 acts as a bottom abutment for the gate so that when the gate is in its lowered position it is held between one of the abutments, in this instance 7, and the bottom strip 6, so that the gate is prevented from movement on its pivotal connection.

An operating or upper framing designated by 15 is supported upon a post 5, said framing including spaced bars 16 arranged above and transversely of the gate. The proximate surface of these bars are provided with wear plates 17, and the pivot rod 9 passes through the bars 16 and through the wear plates in the form of a rounded extension 18. The upper portion of the extension 18 is threaded as at 19 and a lifting element 20 is interiorly threaded to coöperate therewith. The element 20 is in the form of a sleeve and the opening in the upper bar 16 and in the upper wear plate is of sufficient size to accommodate said lifting element. The lower end of the element is formed to provide annular enlargement 21, which is held between the plates 18 whereby the lifting element is permitted rotary movement but prevented from independent longitudinal movement. The lifting element is provided with an operating member 22, which may be in the form of a wheel, rod or other connector whereby the lifting element may be turned. At an appropriate point the extension 18 of the pivot rod is formed with a recess 23, and the upper end of the lifting element is notched at 24 so that when the notch and recess register, there is provided an opening for the reception of a key 25 by which the lifting element and pivot rod may be locked against independent rotation. A cap 26 is provided which may be passed down over the pivot rod and encircle the upper portion of the sleeve to prevent lateral displacement of the key when the latter is in locking position.

In operative or closing position, the gate is at its lowest limit of movement seated against the respective abutments 5 and 7, and in rear of the cross strips 6, whereby it is held in position to close the opening. In operating the gate to open it the lifting element is rotated which by means of the threaded connection with the pivot rod will cause the gate to rise until the lower edge is above the upper edge of the cross piece 6. At this time, the opening 24 is in line with the recess 23, whereupon by the insertion of the key 25 and the application of the cap 26, the lifting element and rod are locked together so that the gate may be swung on the pivot rod by means of the operating member 22, whereupon the openings are free for the outlet of the water.

If desired the section 18 of the pivot rod may be extended and squared as at 27 to slidably receive a segment 28 having a rack section 29, an operating shaft 30 being mounted upon suitable support and carrying a pinion 31 for the coöperation with the rack and the crank handle 32, whereby the shaft may be operated. This structure provides a simple means for shifting the gate on the pivot rod to open and closed position subsequently to the gate being raised by the lifting element.

In Fig. 6 I have illustrated a means whereby the gate may be clamped in closed position to reduce leakage to the minimum, this means including a bar 33 secured upon a leaf 34 hingedly connected at 35 to the strip 36 on the edge of the frame bars 5, the bar 33 bearing against the gate and forcing the same into comparatively tight contact with the abutment, the bar at the same time closing the space beyond the edge of the gate. The bar is of course swung away from the gate when the latter is open, and when in position will tend to reduce leakage to the minimum.

In Figs. 7 and 8, I have shown a slightly modified means to insure a sealing of the gate when in closed position, such means including a projection 37 extending from the frame bars 5 and preferably beveled on the inner surface as at 38. The edges of the gate are formed with notches 39 which when the gate is in closed position are arranged below the projection and when the gate has been elevated to clear the cross bar 6 are disposed in line with the projection so that the gate may be swung on its pivot. The beveled edge of the projection serves to force the gate into closed contact with the abutments when the gate has been moved to fully closed position, thereby tending to seal the connection.

What is claimed is:—

1. An outlet gate for flumes and the like including a gate having an initial vertical movement and a subsequent rotary movement, means carried by the flume structure for preventing swinging movement of the gate in one direction, independent means for locking the gate against swinging movement in either direction, means for initial elevating the gate, and means for utilizing the elevating means for subsequently swinging the gate.

2. The combination with a flume structure or the like, of an outlet gate mounted so as to have an initial vertical movement and a subsequent rotary movement, an elevating member adapted in operation to elevate the gate, and means for locking said member with relation to the gate to permit utilization of the member as means for swinging the gate.

3. The combination with a flume or the like, of an outlet gate adapted to have an initial vertical movement and a subsequent rotary movement when opening, a pivot rod therefor, an elevating member having threaded connection with the pivot rod and means for locking the elevating member with relation to the rod.

4. The combination with a flume or the like, of an outlet gate adapted to have an initial vertical movement and a subsequent rotary movement when opening, a pivot rod therefor, an elevating member having threaded connection with the pivot rod, said member and rod being formed with coöperating recesses, and a key adapted to be inserted in said recesses to lock the elevating member and rod against independent movement.

5. The combination with a flume, of an outlet opening, opposing abutments on opposite edges of said opening, a cross bar at the lower edge of the opening, a gate arranged to have an initial upward movement and a subsequent rotary movement, said gate normally bearing against the abutments and the cross bar, a pivot rod secured to the gate, an elevating member having threaded connection with the rod, means for securing said member against other than rotative movement, and means for locking the member and the rod in a predetermined relative position of the rod and member.

In testimony whereof I affix my signature in presence of two witnesses.

EDWARD H. MARTIN.

Witnesses:
HENRY J. ROONEY,
HENRY LOBNER.

Copies of this patent may be obtained for five cents each, by addressing the "Commissioner of Patents, Washington, D. C."